(12) United States Patent
Brunetiere (10) Patent No.: US 7,867,119 B2
(45) Date of Patent: Jan. 11, 2011

(54) TRANSMISSION SYSTEM COMBINING AN INTERNAL COMBUSTION ENGINE AND AN ALTERNATOR-STARTER

(75) Inventor: Benoît Brunetiere, Tours (FR)

(73) Assignee: Hutchinson, Paris (FR)

( * ) Notice: Subject to any disclaimer, the term of this patent is extended or adjusted under 35 U.S.C. 154(b) by 804 days.

(21) Appl. No.: 10/537,336

(22) PCT Filed: Dec. 1, 2003

(86) PCT No.: PCT/FR03/03539

§ 371 (c)(1),
(2), (4) Date: Jan. 13, 2006

(87) PCT Pub. No.: WO2004/053327

PCT Pub. Date: Jun. 24, 2004

(65) Prior Publication Data

US 2006/0145643 A1    Jul. 6, 2006

(30) Foreign Application Priority Data

Dec. 3, 2002   (FR) ................................. 02 15200

(51) Int. Cl.
*F16H 9/00* (2006.01)
(52) U.S. Cl. ...................... 474/84; 192/48.2; 192/54.51
(58) Field of Classification Search ............. 474/84–89, 474/101–102, 105–110, 112–117; 192/48.1–48.91, 192/48.92, 54.51, 94
See application file for complete search history.

(56) References Cited

U.S. PATENT DOCUMENTS

| | | | |
|---|---|---|---|
| 2,699,854 A * | 1/1955 | Trout, Jr. ...................... 192/51 |
| 3,200,919 A * | 8/1965 | Lanigan et al. ............ 192/48.91 |
| 4,526,257 A * | 7/1985 | Mueller ...................... 192/48.2 |
| 4,662,861 A * | 5/1987 | Seung et al. ................... 474/86 |
| 4,708,229 A * | 11/1987 | Anderson et al. ......... 192/87.17 |
| 5,305,719 A * | 4/1994 | Clarke et al. .............. 123/90.17 |
| 5,539,286 A * | 7/1996 | Brinkmeyer et al. ......... 318/139 |
| 5,909,075 A * | 6/1999 | Heimark ...................... 310/103 |
| 6,773,367 B2 * | 8/2004 | Laufenberg et al. ............ 474/58 |
| 2002/0117860 A1 * | 8/2002 | Man et al. ...................... 290/46 |
| 2002/0123401 A1 | 9/2002 | Henry |

(Continued)

FOREIGN PATENT DOCUMENTS

EP    0 012 669    6/1980

(Continued)

*Primary Examiner*—Robert A Siconolfi
*Assistant Examiner*—Anna Momper
(74) *Attorney, Agent, or Firm*—Michael Best & Friedrich LLP (57) ABSTRACT

The invention relates to a transmission system in which the crankshaft (V) of a combustion engine (M) is coupled via a transmission device using flexible links, particularly of the belt type, to a shaft (1) of an alternator-starter (ATD), characterized in that it has a two-state coupling device, the states being a first state corresponding to a phase for starting the engine, in which the shaft (1) of the alternator-starter (ATD) drives the crankshaft (V) of the engine (M) with a first transmission ratio, and a second state in which the crankshaft (V) of the engine (M) drives the shaft (1) of the alternator-starter (ATD) with a second transmission ratio, and in that the first transmission ratio is higher than the second transmission ratio.

23 Claims, 10 Drawing Sheets

U.S. PATENT DOCUMENTS

2003/0224888 A1* 12/2003 Wilder et al. ............... 474/114

FOREIGN PATENT DOCUMENTS

| FR | 2 711 341 | 4/1995 |
| FR | 2 734 034 | 11/1996 |
| JP | 42-19776 | 10/1967 |
| JP | 47-8829 | 10/1972 |
| JP | 57-36594 | 2/1982 |
| JP | 2001107827 | 4/2001 |

* cited by examiner

Fig. 10A
Section on A-A

Fig. 10B
Section on A-A

Fig. 10C

Fig. 11
Section on A-A

Fig. 12
Section on A-A

Fig. 13
Section on A-A

Fig. 14
Section on A-A

Fig. 15
Section on A-A

Fig. 16
Section on A-A

Fig. 17
Section on A-A

Fig. 18

Fig. 19
Section on A-A

Fig. 20
Section on B-B

TRANSMISSION SYSTEM COMBINING AN INTERNAL COMBUSTION ENGINE AND AN ALTERNATOR-STARTER

The subject of the present invention is a transmission system in which an internal combustion engine is coupled via a transmission device using flexible links, particularly of the belt type, to a shaft of an alternator-starter.

The ability to start a combustion engine directly using the alternator-starter then acting as a starter motor is being given increasing amounts of consideration.

The obvious benefit is that of dispensing with the current starter device (heavy annulus with high inertia and electric starter) and of incorporating this function directly into the alternator-starter.

The alternator-starter needs to be tailored in terms of its power to this new function, while the economic outlook still, on balance, remains positive.

During starting, the crankshaft behaves as a brake, and it is the alternator-starter that does the driving. The driving torque is that provided by the alternator-starter.

In the started mode, the crankshaft does the driving while the alternator-starter acts as a brake. The driving torque is provided by the crankshaft.

However, when the torque needed to start the engine is very high (for example a torque in excess of 90 N.m and, for example, of between 250 N.m and 280 N.m), the maximum torque provided by the currently known alternator-starters requires a transmission ratio of the order of 5 to 6 which means that, when the engine has started, this reduction ratio leads to alternator-starter shaft speeds that can be as high as 36 000 rpm.

As a result, in the current state of the art, an alternator-starter can be used only for low-power or medium-power engines, for which the starting torque is below about 90 N.m.

The object of the present invention is a transmission system that allows an internal combustion engine with a high starting torque to be combined with an alternator-starter or that, for low-power or medium-power engines, allows the use of an alternator-starter that has a lower starting torque than in the prior art.

The invention thus relates to a transmission system in which the shaft of a combustion engine is coupled via a transmission device using flexible links, particularly of the belt type, to a shaft of an alternator-starter, characterized in that it has a two-state coupling device, the states being a first state corresponding to a phase for starting the engine, in which the shaft of the alternator-starter drives the shaft of the engine with a first transmission ratio, and a second state in which the shaft of the engine drives the shaft of the alternator-starter with a second transmission ratio, and in that the first transmission ratio is higher than the second transmission ratio.

The coupling device advantageously comprises a means of detecting the direction of the driving torque so as to place the coupling device in its first or second state selectively.

Advantageously, the transmission system is characterized in that it has a first and a second pulley coaxial with said shaft, in that the flexible link transmission device has a first and a second flexible link collaborating with the first and second pulleys respectively and mounted in such a way as to afford said first and second transmission ratios, and in that, when the coupling device is in the first state, the first pulley is coupled to the shaft of the alternator-starter to afford said first transmission ratio and, when the coupling device is in the second state, the second pulley is coupled to the shaft of the alternator-starter to afford said second transmission ratio.

Advantageously, the diameter of the first pulley is smaller than that of the second pulley.

The system may then be characterized in that the coupling device comprises a means placing the coupling device in its second state when the angular velocity of the shaft drops below the angular velocity of the second pulley.

According to a first variant, the system is characterized in that the first and second flexible links are mounted between, respectively, the first and second pulleys and the grooves of a pulley fastened to the shaft of the engine.

According to a second variant, the system is characterized in that the first flexible link is mounted between the first pulley and a first groove of a double intermediate pulley the second groove of which receives the second flexible link mounted between the second pulley and a groove of a pulley fastened to the shaft of the engine.

In particular, the first groove has a diameter greater than that of the second groove.

According to one particularly advantageous embodiment, the system comprises a tensioning element arranged on a strand part of the second flexible link between the intermediate pulley and the second pulley of the alternator-starter. This strand part actually has the particular feature of being a slack strand part (as opposed to a taut strand part) which is slack both in the starting mode and when the engine has started.

According to a first embodiment variant, the system is characterized in that the coupling device mounted on the shaft of the alternator-starter comprises a first and a second power transmission device, which can be unfastened, which are mounted in opposition, the first between the shaft and the first pulley, and the second between the shaft and the second pulley and fastening or unfastening the shaft and the corresponding pulley according to their relative angular velocities.

According to a preferred embodiment of this variant, said unfastenable transmission devices comprise a free wheel, the two free wheels being mounted in opposite directions.

According to a second variant, the system is characterized in that the coupling device is arranged between the first and the second pulleys and comprises at least one coupling element that can be moved longitudinally parallel to the axis of said shaft between two positions corresponding to the first and second coupling states respectively.

According to a preferred embodiment of this second variant, the system is characterized in that said longitudinally movable coupling element comprises a selector exhibiting a first helical connection, particularly a screw thread or a helical ramp or alternatively a helical cam path collaborating with a complementary secondary helical connection fastened to the shaft of the alternator-starter and at least a lateral face bearing a power transmission element, particularly a friction lining or a dog, and facing a flank of one of the first and second pulleys.

The system may then be characterized in that the selector has a first lateral face facing a flank of the first pulley and bearing a first power transmission element, and a second lateral face bearing a control element able to move in translation parallel to the axis of said shaft and having an end face facing towards a flank of the second pulley and bearing a second power transmission element consisting of a friction lining, and in that the selector bears an elastic return element, such as a spring, which exerts a pressing force on the control element so that said friction lining presses against said flank of the second pulley, or alternatively in that the selector has a first and a second lateral face bearing a power transmission element and facing a flank of the first and second pulleys respectively, and in that it has a control element able to move in longitudinal translation with respect to the selector parallel to the axis of said shaft, the control element having a lateral face facing toward a flank of the second pulley and bearing a second power transmission element consisting of a friction lining, and in that the selector bears an elastic return element, such as a spring, which exerts a pressing force on the control element so that said friction lining presses against said flank of the second pulley, or alternatively still, in that the selector has a first and a second lateral face bearing a power transmission element and facing a flank of the first and second pulleys respectively, and in that it has a control element fastened to the selector and which, for any longitudinal position of the selector, generates a torque which is dependent on the relative angular displacement between the selector and at least one of the first and second pulleys.

In this last case, the control element may have an elastically deformable element which, at its longitudinal ends, has deformable regions which are in contact with the flank of the first pulley and said flank of the second pulley, respectively, at least when the selector is in one longitudinal position, or alternatively, the control element may have, on at least one lateral face, a magnetic element facing a complementary magnetic element borne by a flank of one of the first and second pulleys, or alternatively still, the selector may have, on two opposite lateral faces, a power transmission element, one of them facing a flank of the first pulley, and the other facing a flank of the second pulley, the control element having an annular magnetic element arranged at the periphery of the selector and situated facing a complementary annular magnetic element fastened to the second pulley.

According to yet another embodiment, the control element fastened to the selector may be a friction element, particularly a deformable one, which is situated at its periphery and is in contact with an annular region of the second pulley.

The system may also be characterized in that the selector has a first and a second lateral face bearing a power transmission element and facing a flank of the first and second pulleys respectively, and in that it has a control element able to move in translation with respect to the selector and having, on at least one lateral face, a magnetic element facing a complementary magnetic element borne by a flank of one of the first and second pulleys.

At least one of said first and second pulleys, or alternatively the intermediate double pulley, may be an uncoupling pulley.

According to yet another variant, the coupling device comprises a first and a second power transmission device that can be unfastened and that are mounted to act in opposition, the first being coaxial with the first pulley and the second being coaxial with said double intermediate pulley. In particular, these unfastenable transmission devices may be of any type described hereinabove, having helical connections operating in opposite directions in order to cause said first and second devices to operate in opposite directions. They may also be free wheels responding functionally to torques in opposite directions.

Other features and advantages of the invention will become better apparent from reading the description hereinbelow, in conjunction with the drawings, in which.

Figure 1A:
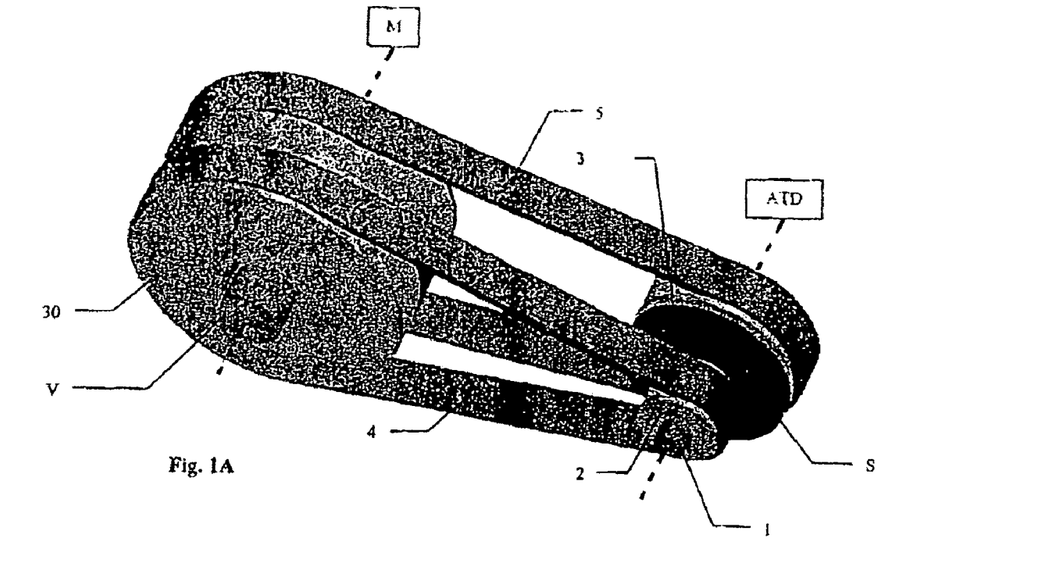
FIGS. 1A and 1B illustrate a first transmission system according to the invention.
Figure 1B:
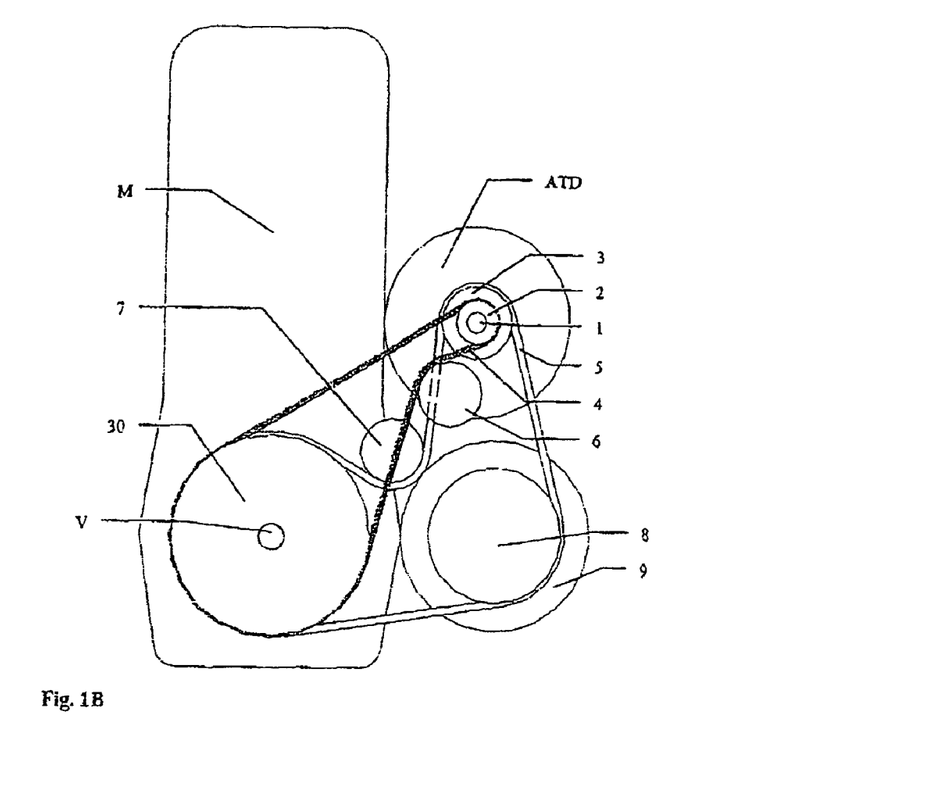

The system depicted in FIGS. 1A and 1B comprises a double pulley 30 mounted on the crankshaft V and two pulleys 2 and 3 of different diameters mounted on the shaft 1 of the alternator-starter ATD, the assembly being connected by two belts 4 and 5.

The two pulleys 2 and 3 are free to rotate with respect to the shaft 1 of the alternator-stator ATD. A sixth element, the selector S, mounted on the shaft 1 of the alternator-starter, is limited in rotation with respect to that shaft. Said "selector", which reacts according to the direction of the torque, becomes coupled to one or other of the pulleys 2 or 3 automatically in order to obtain two transmission ratios between the shaft 1 and the crankshaft V.

During the starting phase, the shaft 1 of the alternator-starter is driving and the selector becomes coupled to the pulley 2. The pulley 2 then drives the crankshaft V via the belt 4, with a high transmission ratio. The pulley 3, which is not coupled, has no influence on the system.

Once the engine has started, the crankshaft V becomes driving. The belt 5 drives the pulley 3 at an angular velocity lower than that of the pulley 2, because of the difference in diameters. The selector therefore becomes coupled to the pulley 3 with a lower transmission ratio. The pulley 3 becomes driving and drives the alternator-starter ATD which then acts as an alternator. As the pulley 2 is no longer coupled to the shaft 1, it remains driven by the belt 4, but no longer transmits power to the alternator-starter ATD.

This yields a transmission system with transmission ratios in which the switching from one to the other occurs on the basis of the direction of the driving torque, according to whether this torque is generated by the alternator-starter ATD or by the engine M.

The combustion engine M provided with a pulley 30 at the end of the crankshaft V thus uses the alternator-starter ATD as a starting system and as a current generator once the engine M has started.

The transmission of power between the engine M and the alternator-starter ATD is afforded in the starting mode and in the started mode by the flexible links 4 and 5 respectively (in particular, belts). These are connected on the one hand to the pulley 30 of the crankshaft V of the engine M, which is a double pulley and, on the other hand, to the pulleys 2 and 3 mounted on the shaft 1 of the alternator-starter ATD for the flexible links 4 and 5 respectively.

Figure 3:
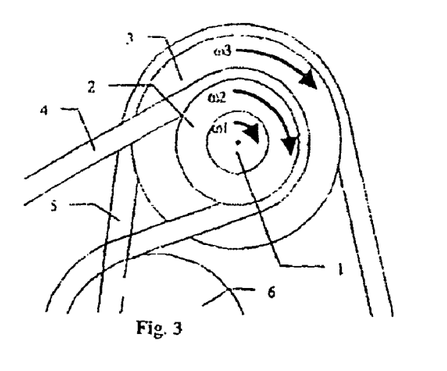
FIGS. 3 to 8 illustrate a transmission system with two free wheels mounted in opposition, according to the invention.
Figure 4:
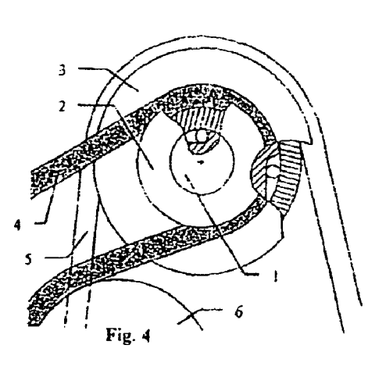

This link may be achieved by unfastenable transmission mechanisms mounted in opposition between the shaft 1 and the pulley 2 and between the shaft 1 and the pulley 3, so that power is transmitted between the shaft 1 and the pulley 30 of the crankshaft V via the pulley 2 and the flexible link 4 in the starting mode and power is transmitted between the pulley 30 of the crankshaft V and the shaft 1 via the pulley 3 and the flexible link 5 in the started mode (FIGS. 3 and 4).

It is possible to run various accessories using the flexible links 4 and 5. FIG. 1B depicts an example of a driveline in which the pulley 8, driven by the flexible link 5, is coupled to the accessory 9.

Likewise, the pulleys 6 and 7 which rotate as one with the belt 4 and the belt 5 respectively may drive accessories (not depicted in the figure, for example the power steering, the air conditioning, the water pump, etc) or may act as mechanisms for tensioning the flexible links 4 and 5.

With a view to improving the solutions shown earlier (using a transmission selection mechanism on the shaft 1 of the alternator-starter ATD), and with a view to making minimal modifications to the pulley 30 of the crankshaft V, it is possible (see FIGS. 2A and 2B) to use an intermediate double pulley 23. What this does is allow the starting power supplied by the pulley 2 to be transmitted via the flexible link 4 mounted on its pulley $23_2$, of diameter D2, to the pulley 30 of the crankshaft V via the flexible link 5 mounted on its pulley $23_1$ of diameter D1.

Figure 2A:
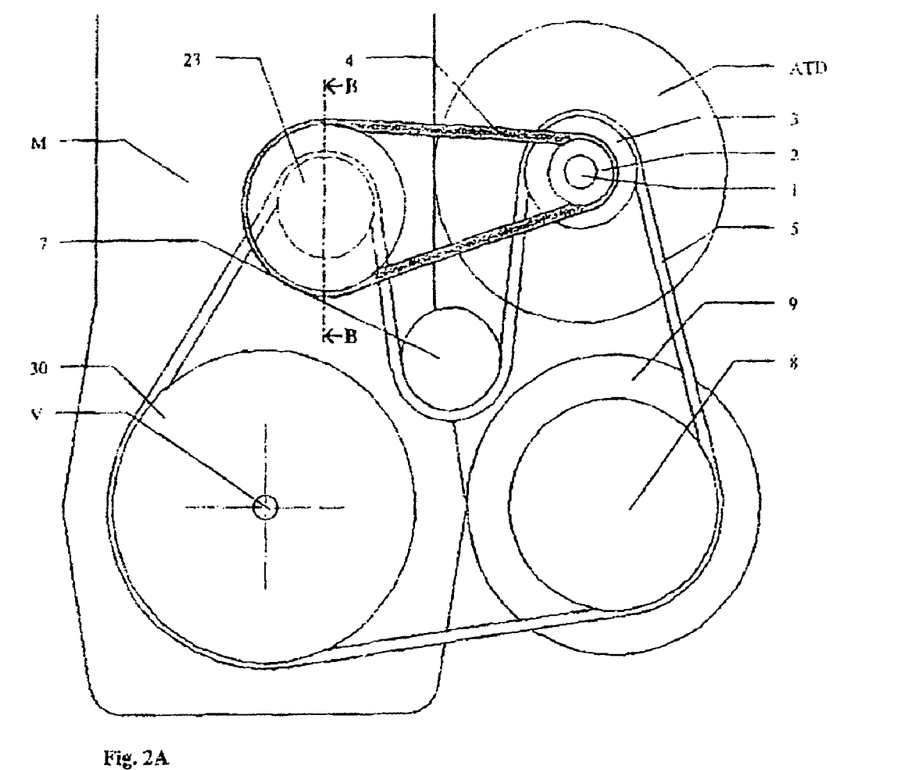
FIGS. 2A and 2B illustrate a second transmission system according to the invention.
Figure 2B:
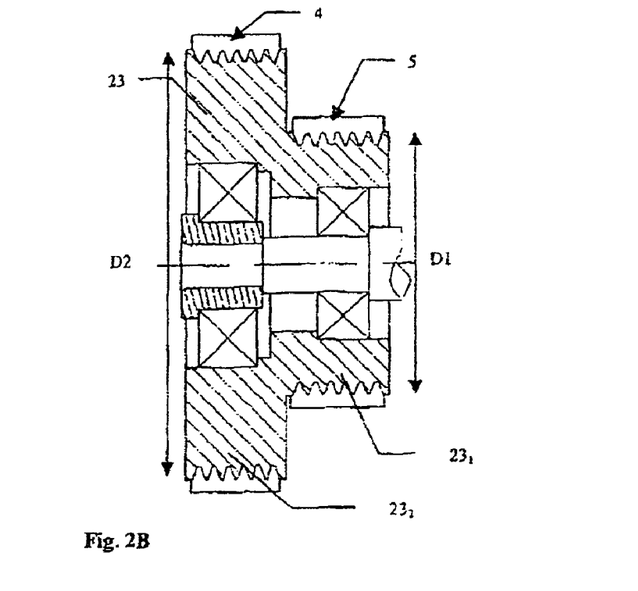

When the alternator-starter ATD is being used in alternator mode, the transmission of power between the pulley 30 of the crankshaft V and the pulley 3 of the alternator-starter ATD is as before, by way of the flexible link 5. The double pulley 23 then acts as an idler pulley.

The ratio of diameters between D1 and D2 needs to be such that it is possible to start the combustion engine M, while at the same time maintaining sufficient contact areas at the pulleys 2 and 23 using the flexible links 4 and 5.

In this configuration it is possible to use a conventional pulley 30 for the crankshaft V. The double pulley 23 may drive an accessory. Each of the two flexible links 4 and 5 may drive accessories (example: 9 via the pulley 8), with the rotational velocity necessary. The pulley 23 may be mounted on a tensioning mechanism of the tensioner type, or alternatively this function may be provided directly by an elastic belt. The pulley 7 may be mounted on a tensioning mechanism, this scenario having the benefit of providing a mechanism for tensioning the flexible link 5 (which transmits the power to the pulley 30 of the crankshaft V) to the optimum tension irrespective of the mode of operation of the alternator-starter ATD. What happens is that during starting mode, the transmission of power is from the pulley 23 to the pulley 30 of the crankshaft V, and the pulley 7 acting as a tension element is located on a slack strand part of the flexible link 5 between the pulley 23 and the pulley 2. Further, in alternator mode, power is transmitted from the pulley 30 of the crankshaft V to the pulley 3 of the alternator-starter ATD via the flexible link 5 and the pulley 7 which acts as a tensioning element is once again on a slack strand part of the link 5. Now, the best position for a tensioning element, in order to keep a flexible link under tension, is for it to be positioned on a slack strand part (as opposed to a tight strand part), as in the two modes of operation presented.

FIGS. 3 to 8 illustrate an embodiment in which the driving torque is detected by free wheel devices 41 and 42 mounted in opposition between the shaft 1 (or continuation thereof) and the pulleys 2 and 3 respectively.

Figure 5:
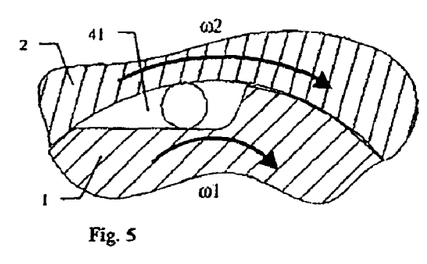
Figure 6:
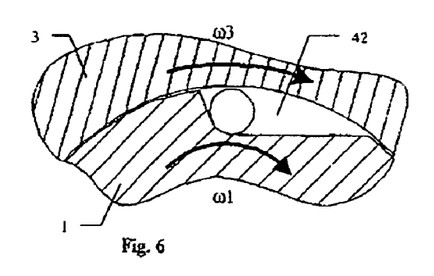

Startup Mode of Operation (FIGS. 5 and 6)

With the combustion engine not running, the pulleys 2 and 3 connected to the pulley 30 of the crankshaft V via the flexible links 4 and 5 respectively are stationary. When voltage is applied to the alternator-starter ATD, the shaft 1 of the alternator-starter ATD begins to turn at an angular velocity $\omega_1$. The power transmission mechanism 41 transmitting power between the shaft 1 and the pulley 2 engages, so as to fasten the shaft 1 to the pulley 2 (FIG. 5). Power is transmitted from the shaft 1 to the pulley 2, which has a radius of $R_2$. The pulley 2 therefore turns at an angular velocity $\omega_2 = \omega_1$. The pulley 2 drives the rotation of the pulley 30 of the crankshaft V which has a radius $R_v$ at a velocity $\omega_v$ via the flexible link 4 in order to turn over the combustion engine. The pulley 30 of the crankshaft V, which turns at the angular velocity $\omega_v$, is also connected to the pulley 3, which has a radius of $R_3$, via a flexible link 5 and so the pulley 3, which has a radius of $R_3$, is driven in rotation at the angular velocity $W_3$. The velocity calculation yields:

$$\omega_3 \times R_3 = \omega_V \times R_V \text{ and } \omega_2 \times R_2 = \omega_V \times R_V \text{ hence } \omega_3 = \omega_2 \times \frac{R_2}{R_3}$$

Now $R_3 > R_2$, hence $\omega_3 < \omega_2 = \omega_1$.

The calculation therefore shows that $\omega 3$ is less than $\omega 1$, which means that the power transmission mechanism does not engage and leaves the pulley 3 unfastened from the shaft 1. There is therefore no transmission of power between the shaft 1 and the pulley 3 (FIG. 6).

Figure 7:
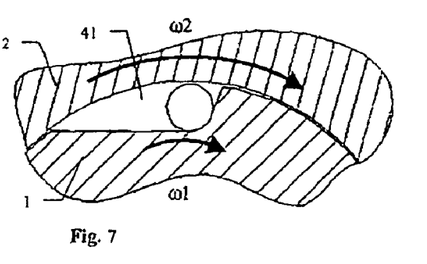
Figure 8:
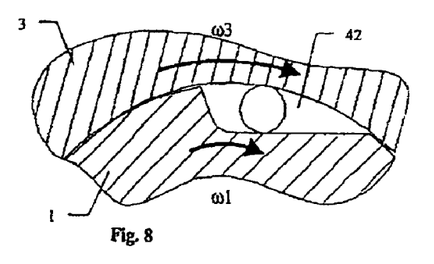

Alternator Mode of Operation (FIGS. 7 and 8)

The combustion engine has started and the pulley 30 of the crankshaft V is turning at an angular velocity $\omega_V$. The pulleys 2 and 3 are driven at a velocity $\omega 2$ and $\omega 3$ respectively. The alternator-starter ATD switches to alternator mode, it is no longer powered and the velocity $\omega 1$ tends to diminish. The power transmission mechanism 41 transmitting power between the shaft 1 and the pulley 2 unfastens them. There is no longer any transmission of power between the pulley 2 and the shaft 1 (FIG. 7). At the instant the velocity $\omega 1$ diminishes to the point of being lower than the velocity $\omega 3$, the power transmission mechanism 42 transmitting power between the pulley 3 and the shaft 1 fastens these two elements together. Power is therefore transmitted between the pulley 3 and the shaft 1 (FIG. 8).

The embodiment below implements an automatic selection mechanism 10 (see FIG. 9) arranged for example between the flanks 2' and 3' of the pulleys 2 and 3 and which allows power to be transmitted between the shaft 1 and the pulley 2, on the one hand, and the pulley 3 and the shaft 1, on the other, according to whether the mode of operation is starter mode or alternator mode respectively.

Figure 9:
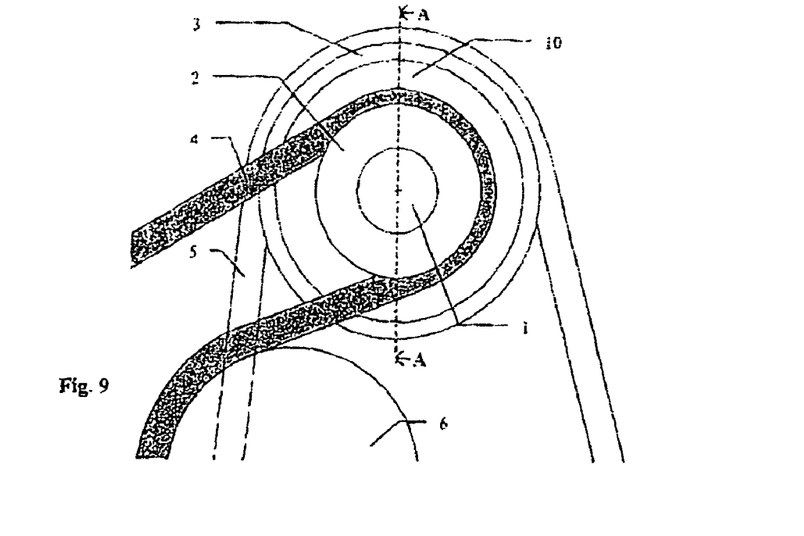
FIGS. 9 and 10A to 10C illustrate, in sections on A-A of FIG. 9, FIG. 10B being a partial section, a selector system having friction linings according to the invention.

Used as an intermediate transmission element, the selector, which moves along the axis of the shaft 1, allows power to be transmitted by use of a friction surface, a fitting-together mechanism, a magnetic transmission or any other type of system with which the selector 10 may be equipped in order to transmit torque between the shaft 1 and the pulleys 2 and 3.

In order to be able to operate in perfect autonomy the automatic selection system needs to be able to control itself in order to determine the mode of operation of the alternator-starter ATD and to manage the transient modes: the switch from starter mode to alternator mode and vice-versa.

Figure 10A:
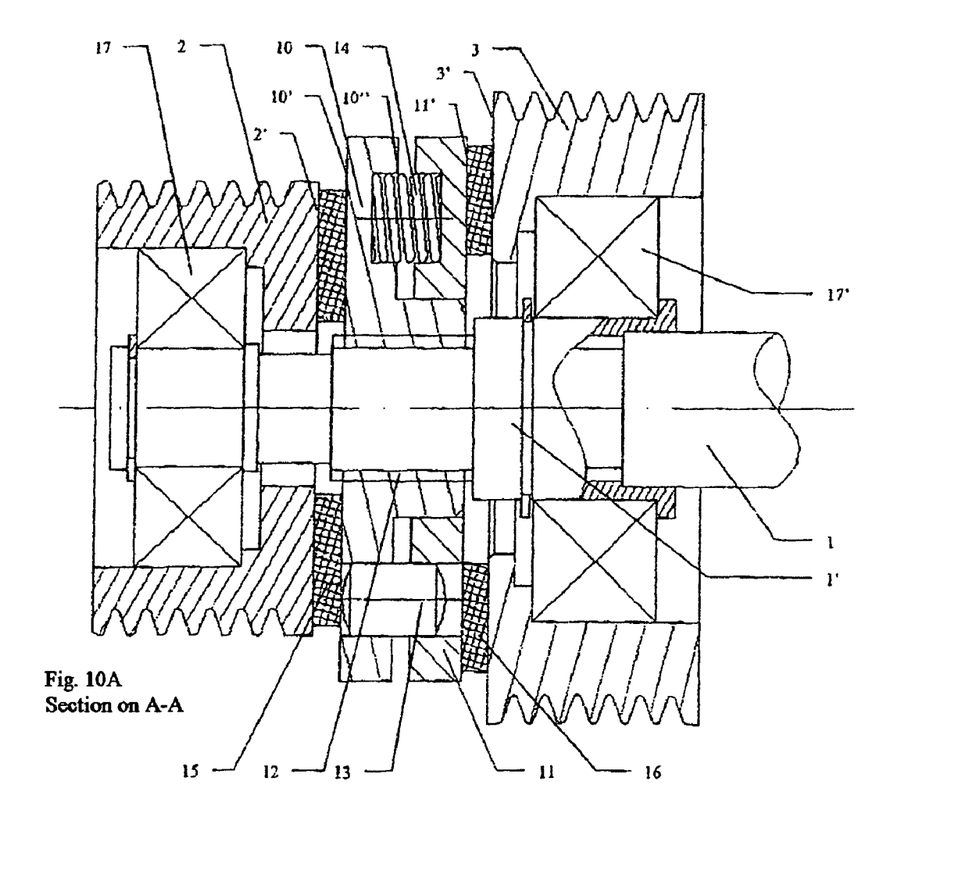
Figure 10B:
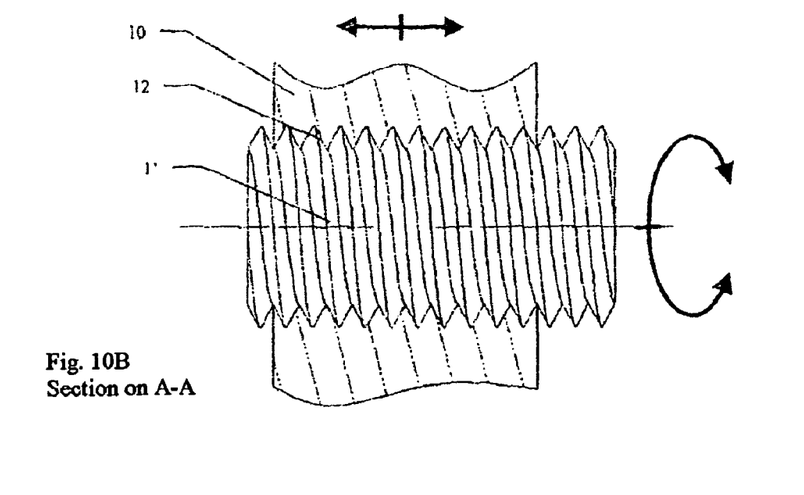

The use of a helical guidance system 12 (using a screw as depicted in FIG. 10B or a cam path) for guiding the selector 10 makes it possible to detect the changes in mode of operation and, by means of a control element 11 which may or may not be fastened to the selector 10, particularly to a lateral face 10" of the selector 10, allows the selector to be positioned in the correct location for transmitting power between the shaft 1 and the pulleys 2 or 3 depending on the mode of operation required. The control mechanism provides the torque required for freeing (if there is any jamming) and for displacing the selector 10 in its helical guide 12.

Mechanism with Selector Having Friction Lining (FIG. 10A)

The pulleys 2 and 3 are in a pivot connection with the shaft 1' via bearings 17 and 17' respectively.

The mechanism with selector having friction linings positions itself in the same position and in conditions similar to those of the mechanism depicted in FIG. 4. The selector 10 is connected to the shaft 1' which is itself fully connected to the shaft 1 of the alternator-starter ATD, via a helical connection 12. The control element 11 is restricted to an axial displacement with respect to the selector 10 via the guide elements 13. On each side of the assembly consisting of the selector 10 and the control element 11 are fixed friction linings 15 and 16 (on the lateral faces 10' and 11' of the selector 10 and of the control element 11 respectively). These friction linings 15 and 16 are specified such that it is possible to transmit the required torque between the pulleys 2 and 3 and the shaft 1' in full connection with the shaft 1 via the selector 10 and control element 11 assembly when the pressing force applied to them is strong enough.

The elastic element or elements 14 (particularly springs) create a pressure force on the assembly consisting of the control element 11 and the friction lining 16 pressing it against the flank 3' of the pulley 3 so as permanently to transmit a minimum torque to the control element 11 that is required for the correct displacement of the selector 10 along the helical connection 12 so that it can position itself correctly according to the mode of operation.

Starter Mode of Operation (FIG. 10A and 10B)

The combustion engine is not running, the pulleys 2 and 3, connected to the pulley 30 of the crankshaft V via the flexible links 4 and 5, respectively, are stationary. At the instant that power is applied to the alternator-starter, the shaft 1 of the alternator-starter ATD and the shaft 1' begin to turn. The resistive torque exerted by the control element 11, connected to the pulley 3 via the friction lining 16 subjected to the pressure of the elastic elements 14, keeps the selector 10 fixed and unable to rotate with respect to the pulley 3, via the guide elements 13. Because the shaft 1 is rotating, there is therefore an axial displacement of the selector 10 along the helical connection 12 of the shaft 1' until it encounters the pulley 2 then becomes wedged between the flank 2' of the pulley 2 and the helical connection 12 in order finally to drive the rotation of the pulley 2 at the same speed as the shaft 1', fastened to the shaft 1, via the friction lining 15 subjected to the wedging pressure. The pulley 2 is driven in rotation at the same velocity as the shaft 1 and so the engine is turned over and then started by the pulley 30 of the crankshaft V connected to the pulley 2 by the flexible link 4.

Switch to Alternator Mode of Operation

The combustion engine is ignited, the pulley 30 of the crankshaft V is turning at a velocity $\omega_V$. The pulleys 2 and 3 are being driven at a velocity $\omega 2$ and $\omega 3$ respectively. The alternator-starter ATD switches to alternator mode, it is no longer powered, the velocity $\omega 1$ tends to diminish while the velocity $\omega 2$ tends to remain constant, or even to increase: the assembly consisting of the selector 10 and the friction lining 15 then become unwedged from the pulley 2 and the helical connection 12 of the shaft 1'. The assembly comprising the control element 11 and the friction lining 16 is still in contact with the pulley 3, as a result of the pressing force of the elastic elements 14. The velocity $\omega 3$ of the pulley 3 tends to remain constant or to increase and so there is slippage of the shaft 1 and of the mobile assembly 10/11/15/16 because $\omega 2 > \omega 1 > \omega 3$: the helical connection 12 does not allow the selector 10 to engage with the pulley 2 because $\omega 2 > \omega 1$ and, for the same reason, the selector 10 does not engage with the pulley 3 because $\omega 1 > \omega 3$. There is therefore slippage between the shaft 1 and the pulleys 2 and 3. At the instant the $\omega 1$ of the shaft 1 tends to drop below the velocity $\omega 3$ of the pulley 3 the assembly consisting of the control element 11 and the friction lining 16 then exerts a driving torque on the selector 10, the velocity of which is equal to that of the shaft 1, and there is an axial displacement of the selector 10 towards the pulley 3, then wedging of the selector assembly 10, via the control element 11 and the friction lining 16, between the flank 3' of the pulley 3 and the helical connection 12 of the shaft 1'. In that case, power is transmitted between the pulley 3 and the shaft 1 fastened to the shaft 1'.

The mechanism 12 therefore performs the following function:

When the selector 10 is limited in rotation (for example, via the guide elements 13 which rotate as one with the control element 11) and when the shaft 1', fastened to the shaft 1 of the alternator-starter ATD, tends to rotate at a different velocity than the latter, an axial displacement of the selector 10 on the helical connection 12 is generated by the relative rotation of the shaft 1' with respect to the selector 10. All that is required for that is for the difference in torque between the selector 10 and the shaft 1' to be high enough to overcome the forces, generally low, due to the internal friction of the helical connection 12 depicted in greater detail in figure 10B.

Figure 10C:
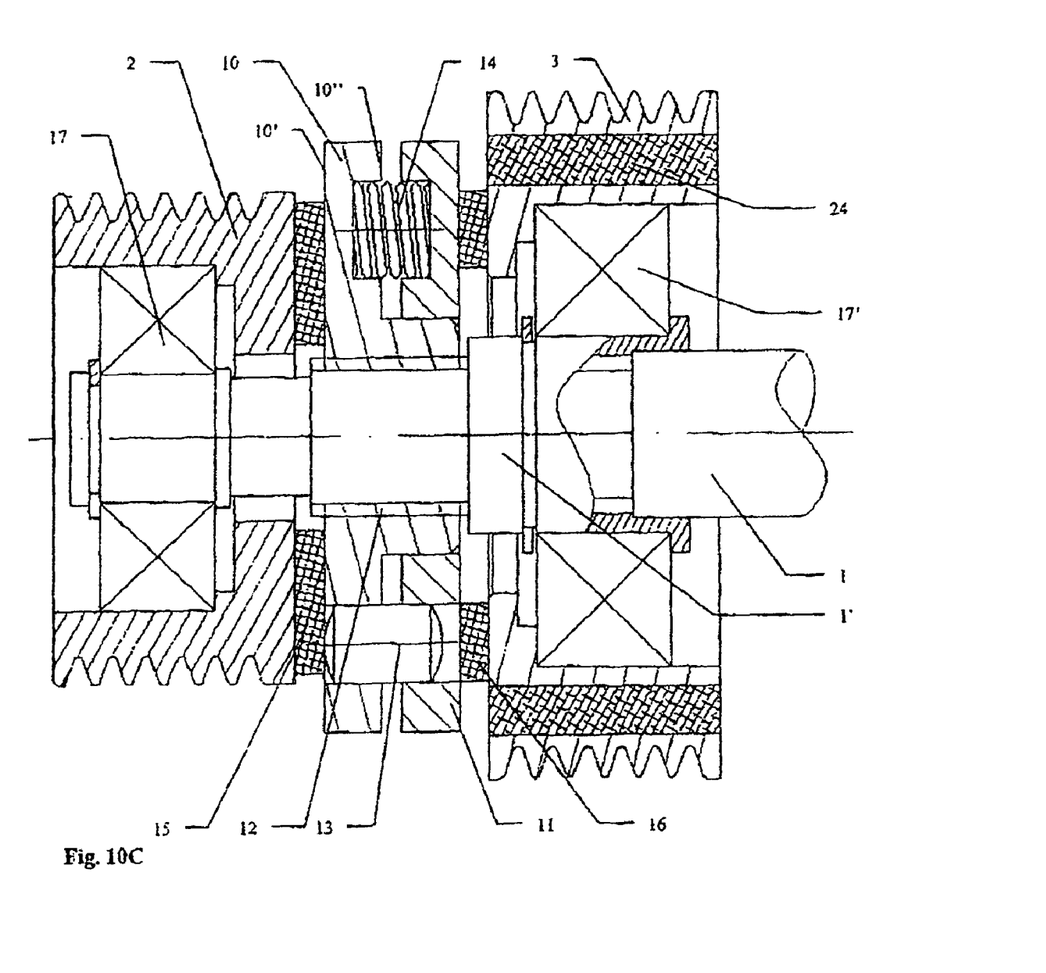

FIG. 10C depicts a mechanism similar to that of FIG. 10A with the incorporation into the alternator pulley 3 of an uncoupling system 24 consisting of one or more elastomer blocks 24, for example as in patent FR 2 734 034 by the Applicant Company, or patent EP 12669. Such a system may just as easily be incorporated into some other element such as the pulley 2 provided it is able to perform its function of uncoupling in alternator mode. It may be made up of a known existing mechanism or of a novel mechanism.

Figure 11:
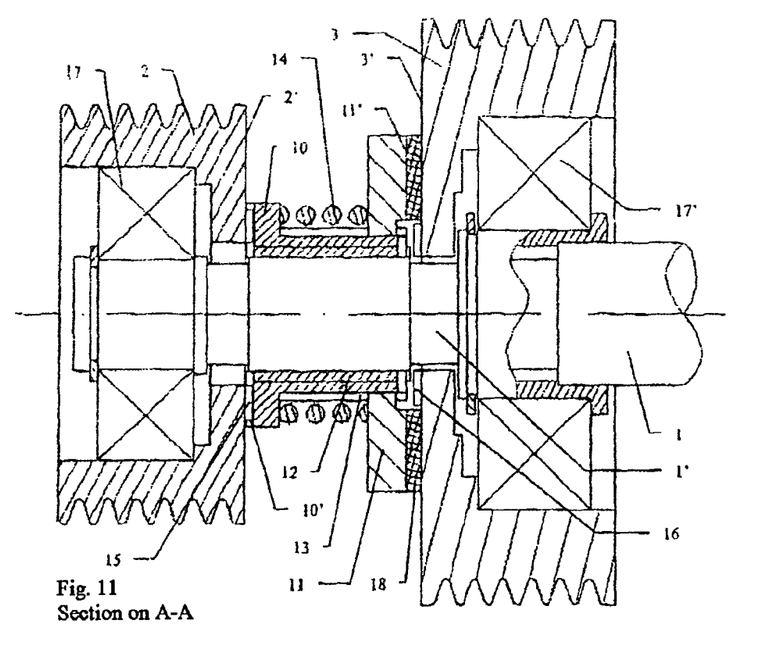
FIG. 11 illustrates a system according to the invention in which the coupling of power is performed by dogs whereas the control uses a friction lining.

The system set out in FIG. 11 is similar to that of FIGS. 10A to 10C but the power transmission elements 15 and 16 are arranged on each side of the selector 10. They may be of the friction type or of the dog type. The control element 11 has a face 11' provided with a friction lining 18 whose purpose is to permanently provide the torque that the control element 11 needs to move the selector 10 axially along the helical connection 12 via the guide element 13. The functions of transmitting power between the alternator-starter ATD and the pulleys 2 and 3 and of transmitting a minimal amount of torque to the control element 11 have thus been separated.

Figure 12:
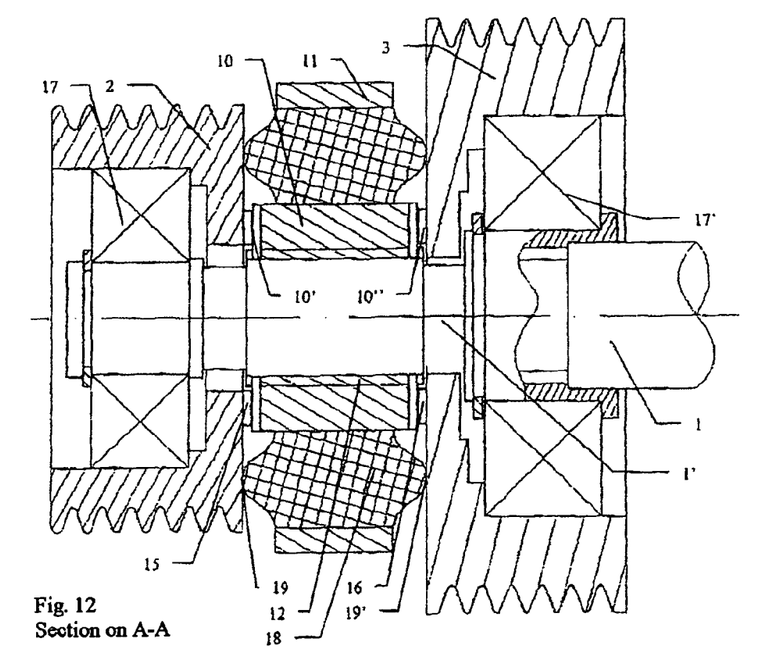
FIGS. 12 and 13 illustrate a system according to the invention in which the control is performed using at least one deformable element.
Figure 13:
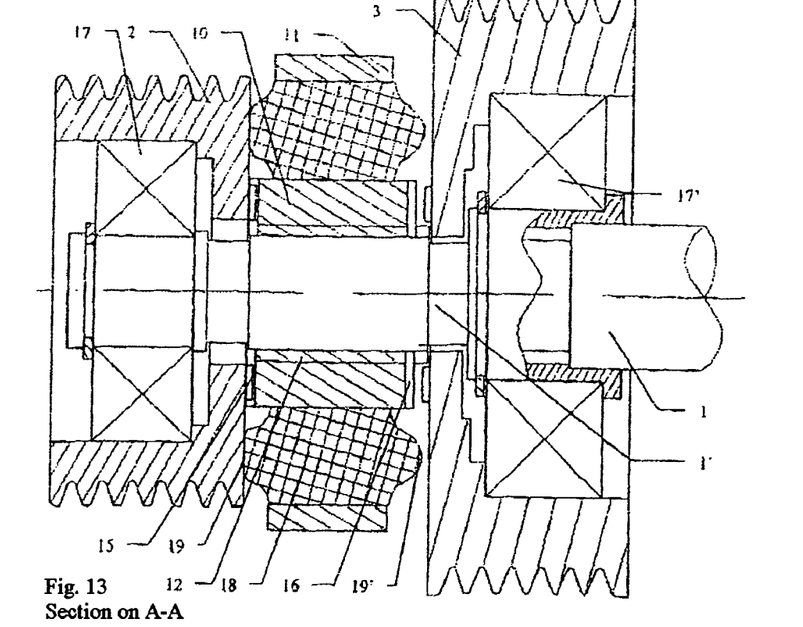

The mechanism set out in FIGS. 12 and 13 incorporates into the selector 10 an element 18 (which may be made of a deformable material of the elastomer type, particular of rubber) and which, through its shape, has surfaces for contact 19 and 19' with the pulleys 2 and 3. The deformable element 18 makes it possible to have, at each position occupied by the selector 10, contact either at 19 or at 19' with one or other of the two pulleys 2 and 3 (or even with both at the same time) so as to obtain a torque between the deformable element 18 and the pulleys 2 and 3, to move the selector 10, fastened to the deformable element 18, on its helical connection 12 along the shaft 1' connected to the shaft 1 of the alternator-starter ATD according to the mode of operation.

Starter Mode (FIG. 13)

The operation of the system set out here is similar to that of FIGS. 10A to 10C, except that there is no permanent contact between the elastic element 18 and the pulley 3, in the starting mode, thus avoiding needless friction.

The contact 19 between the elastic element 18 and the pulley 2 makes it possible to provide the selector 10 with sufficient torque when the combustion engine M is started, the angular velocity ω1 of the shaft 1 drops below the velocity ω2 of the pulley 2 to unfasten the assembly consisting of the selector 10 and the elastic element 18 from the pulley 2.

Switch to Alternator Mode

The assembly comprising the selector 10 and the elastic element 18 unfastened from the pulley 2 is once again in contact with the pulley 3 via the elastic element 18 at the contact surface 19'. As the pulley 3 is rotating at an angular velocity ω3 greater than ω1, the velocity of the shaft 1 causes the selector 10 to move on the helical guide 12, by friction at the contact 19'. The selector 10/elastic element 18 assembly becomes unfastened from the pulley 3 to allow power to pass with the shaft 1 via the power transmission element 16.

Figure 14:
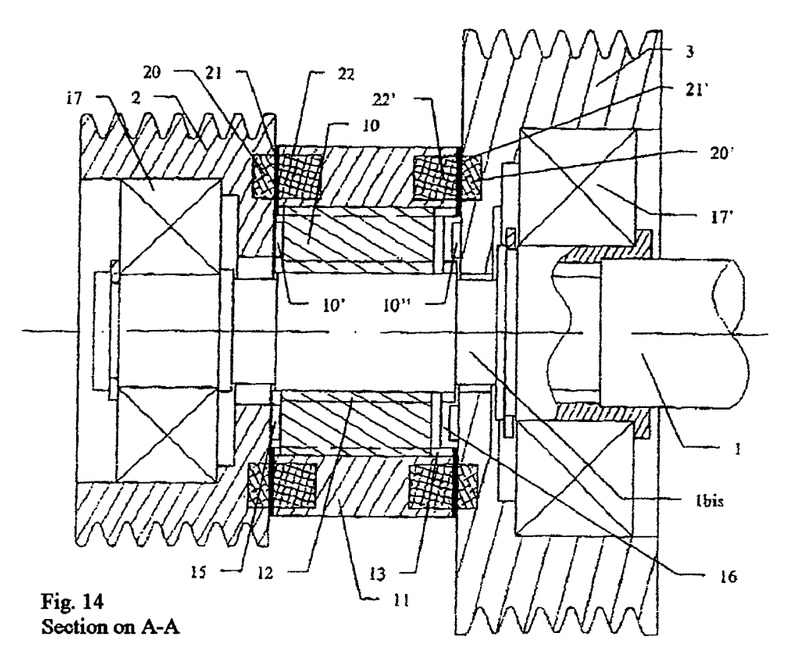
FIGS. 14 and 15 illustrate an implementation of the invention in which the control is done by magnetic coupling and axial displacement, the control being able to move with respect to the selector (FIG. 14) or being fastened to the latter (FIG. 15)

FIG. 14 illustrates a mechanism with magnetic control. This mechanism uses a control similar to that of FIGS. 10A to 10C but using the magnetic force instead of the friction force to act on the selector mechanism.

The selector 10 is in helical connection 12 with the shaft 1' fastened to the shaft 1 of the alternator-starter ATD. The control element 11, in a gliding connection 13 with the selector 10, is provided with magnetic elements 22 and 22' (which may be multipole permanent magnets) near the flanks of the pulleys 2 and 3 respectively). Likewise, arranged facing the magnetic elements on the flanks of the pulleys 2 and 3 are elements 20 and 20' (which may be made of a material exhibiting hysteresis) separated by air gaps 21 and 21' (which may be made of a magnetically insulating material) in order to separate them from the magnetic elements 20 and 20' respectively. This magnetic assembly 20 to 22 and 20' to 22' allows the control element 11 to be given a driving or resistive torque according to the mode of operation so that it operates as in the case set out in FIG. 12. What happens is that an element made from a material exhibiting hysteresis, like the elements 20 and 20', subjected to a rotating magnetic field creates a torque that opposes the movement, and this corresponds to the operation equivalent to the friction element 18 of FIG. 12. It is also necessary to have enough control torque to allow the selector 10 to be moved on the helical guide 12.

A variant of this system is to use just one magnetic control assembly (20', 21' and 22', for example) which generates enough torque for the control.

Figure 15:
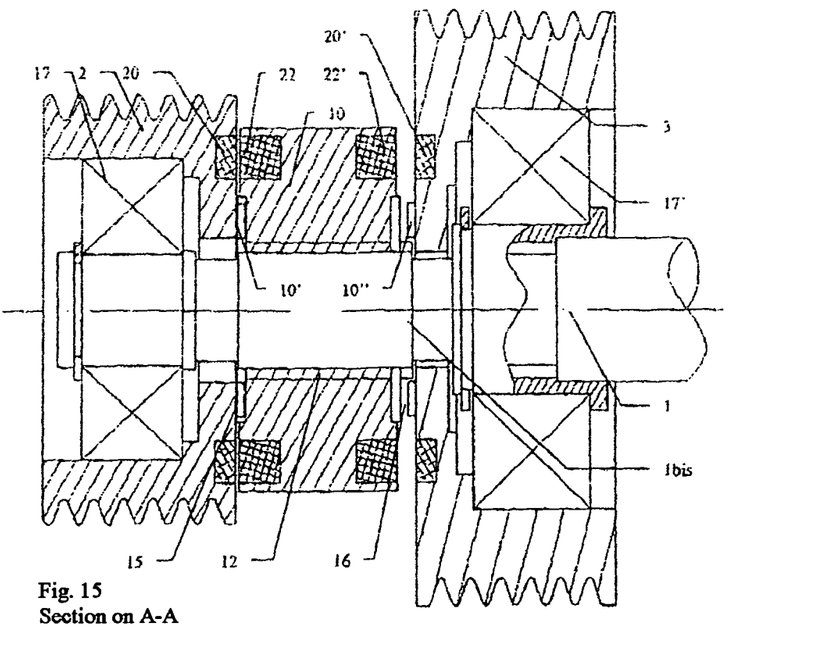

FIG. 15 depicts an embodiment employing a built-in magnetic control mechanism. The principle of operation of this mechanism is similar to the previous one (FIG. 14). The difference is that there is no separate control element and that the magnetic elements 22 and 22' are incorporated into the selector 10. In this case, there is no longer any need to use air gaps because the magnetic elements 22 and 22' move with the selector 10. The magnetic elements 22 and 22', and their opposites, the elements 20 and 20' on the pulleys 2 and 3 respectively, provide enough control torque to allow the selector 10 to be moved on its helical connection 12 with the shaft 1' with a variable air gap.

As with the previous system, it is possible to use just one magnetic assembly (20' and 22' for example) to cause the selector 10 to move.

Figure 16:
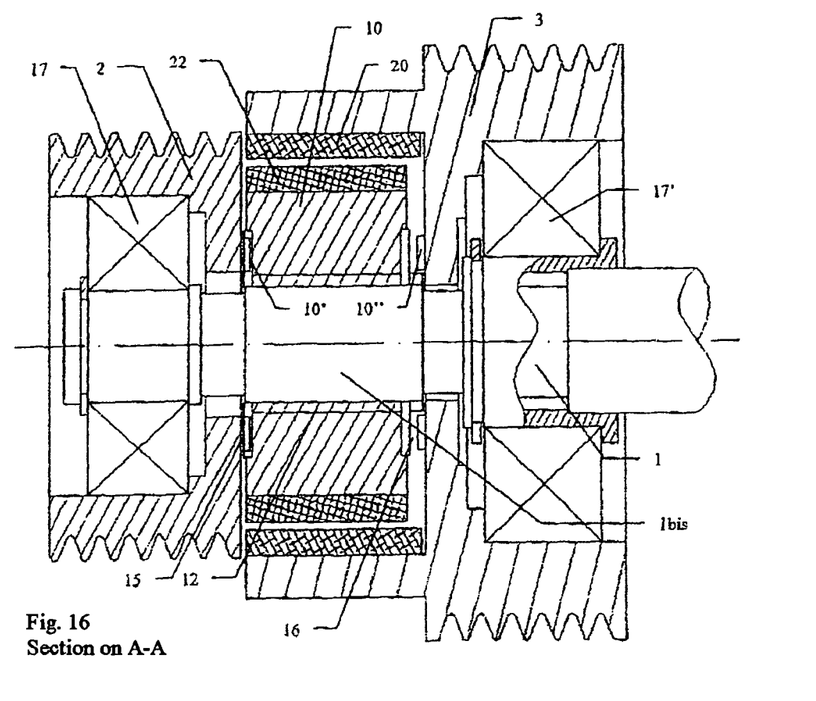
FIG. 16 illustrates one implementation of the invention in which the control is performed by peripheral mechanical coupling.

FIG. 16 employs a magnetic control mechanism of cylindrical overall shape. As with the mechanism of FIG. 15, the selector 10 has a magnetic element 22 (which may be of the multipole magnetized ring type) on its external periphery with, opposite, the element 20 (which may be made of a material exhibiting hysteresis) fastened to the pulley 3. The benefit of such a system over the previous one is that it maintains a constant air gap distance, on the one hand, and that the magnetic element 22 always "sees" an area equivalent to its own on the element 20 situated opposite it. In this configuration, the control torque, generated by the magnetic assembly 20 and 22, causes the selector to move on the helical guide 12 according to the mode of operation (starting mode or started mode).

Figure 17:
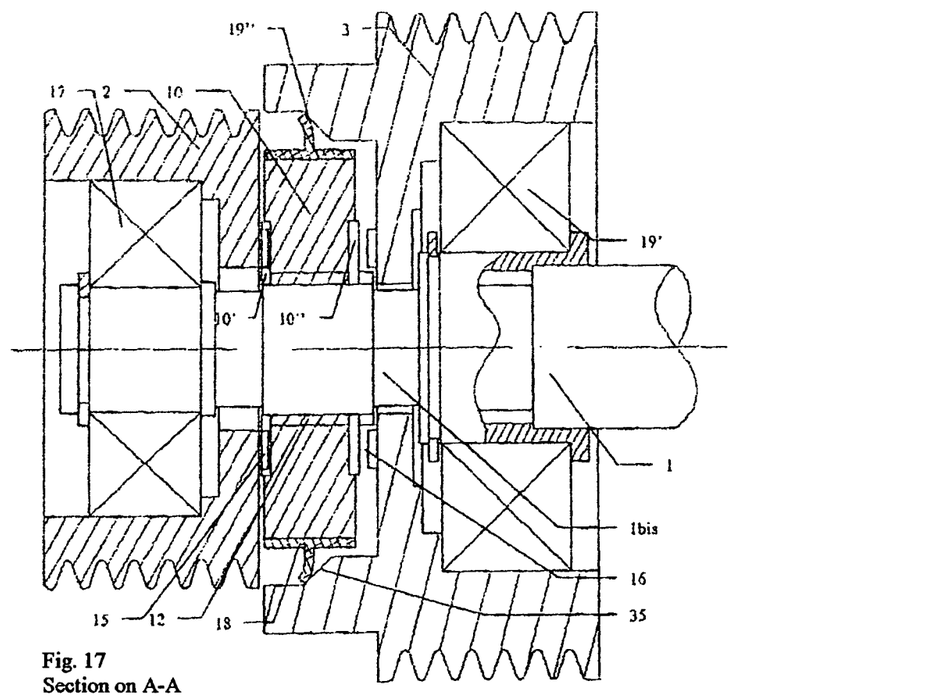
FIG. 17 illustrates an implementation of the invention in which the control is performed by peripheral coupling using friction.

FIG. 17 depicts an embodiment which implements a mechanism with a selector employing peripheral contact. The principle of operation of this mechanism is similar to that of FIG. 16 but using a friction element 18 rather than a magnetic assembly. An annular friction element 18, made of deformable material, for example of elastomer, is fastened to the selector 10 and in frictional contact with the pulley 3 at the contact 19" which extends over at least part of the periphery of the element 18. The frictional torque generated at 19" allows the selector 10 to be moved according to the mode of operation. In addition, it may be possible to use an inclined friction surface 35 on the pulley 3 so as to limit the friction of the element 18 on the pulley 3 in the starting mode.

Figure 18:
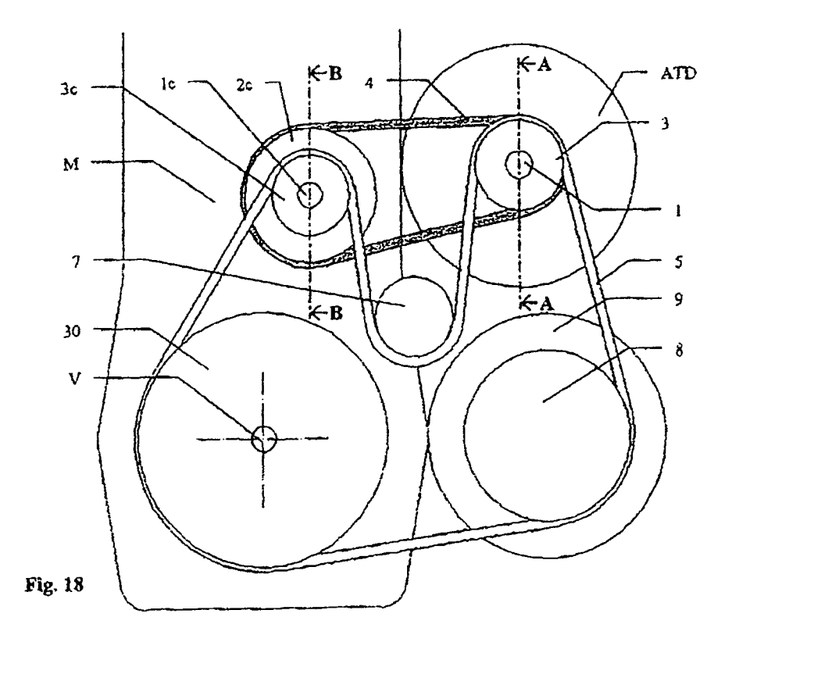
FIGS. 18 to 20 illustrate another implementation of the invention for a transmission system (FIG. 18) which is a variant of FIG. 2A, FIGS. 19 and 20 being sections on A-A and B-B of FIG. 18, respectively.

In FIG. 18, the flexible link 5 (in the foreground) transmits the power between the pulley 30 of the crankshaft V and pulleys 3 and 3c of the alternator-starter ATD and of an accessory C (not depicted, identified by its shaft 1c), respectively. Likewise, the flexible link 4 (darkened) transmits its power between the pulleys 2 and 2c of the alternator-starter ATD and of the accessory C respectively. In the drawings, and for a better understanding, the elements of the mechanism that are mounted on the accessory C bear the index c.

Figure 19:
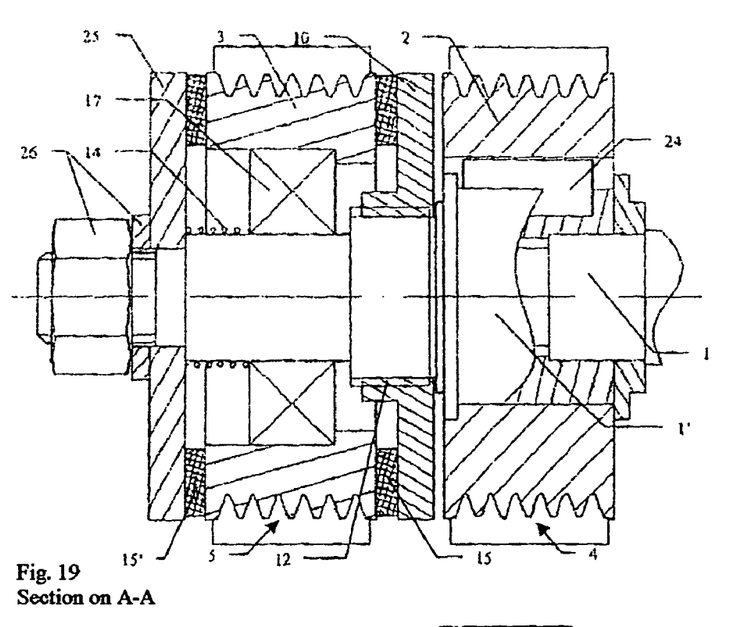
Figure 20:
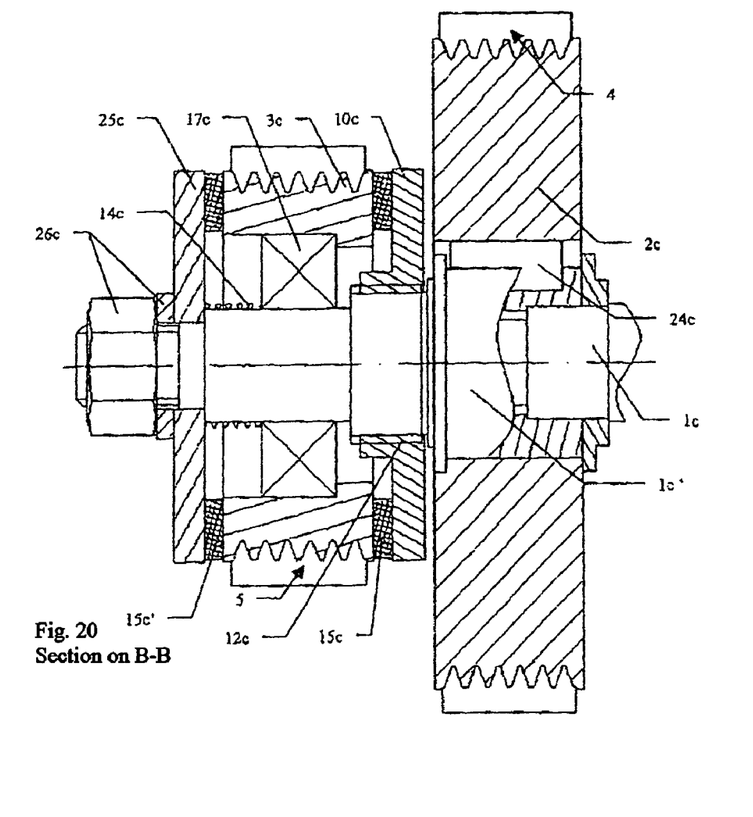

The proposed solution employs two pulleys with a simplified selector (the pulleys are depicted in FIGS. 19 and 20). On the basis of the solution of FIG. 2A, it is possible to simplify the automatic selection mechanism mounted on the shaft 1 of the alternator-starter ATD by using two selection mechanisms, one mounted on the shaft 1 of the alternator-starter ATD and the other on the shaft 1c which may be the shaft of an accessory C (not depicted in FIG. 18). This solution has the advantage of using two almost-similar selection mechanisms with a reduced number of components and a smaller bulk. In this configuration, the shaft 1c of the accessory C rotates at a normal angular velocity lower than that of the shaft 1 of the alternator-starter ATD (which is the case in most current drivelines).

Starting Mode

At the alternator-starter ATD (FIG. 19).

The combustion engine M is not running, the crankshaft V is stationary, the alternator-starter ATD is driving and the shaft 1 begins to turn. The shaft 1', fastened to the shaft 1, drives the rotation of the pulley 2 via the guide 24.

The elastic element 14 exerts a light pressing force on the bearing 17 of the pulley 3 so that this pulley is in contact with the friction lining 15 fastened to the selector 10. The pulley 3 can then become partially unfastened from the selector assembly 10 and 15 under the action of its resistive torque, via the flexible link 5 fastened to the pulley 30 of the crankshaft V, and the driving torque of the shaft 1' on the selector 10 via the helical connection 12, both associated with the pressing force provided by the elastic element 14. There is therefore slippage between the pulley 3 and the assembly of the automatic selector mounted on the shaft 1 of the alternator-starter ATD.

At the accessory C (FIG. 20), the pulley 2c is driven in rotation at a velocity ω2c via the flexible link 4 in proportion to the velocity ω2 of the pulley 2 and their respective radii. Thus, by calculation, we get:

$$\omega_2 \times R_2 = \omega_{2c} \times R_{2c}, \text{ hence } \omega_{2c} = \omega_2 \times \frac{R_2}{R_{2c}}, \text{ now } R_{2c} > R_2,$$

hence $\omega_{2c} < \omega_2 = \omega_1$ give or take the ratio k where $$k = \frac{R_2}{R_{2c}}.$$

In FIG. 20, elements homologous with those of FIG. 19 bear the same reference numerals, with the suffix c added.

The automatic selector depicted in FIG. 20 mounted on the shaft 1c of the accessory C is similar to the one mounted on the shaft 1 of the alternator-starter ATD, except for two differences:

the diameter of the pulley 2c is greater than that of the pulley 2, the direction of the helical connection 12c is the reverse of that of the helical connection 12.

The second difference mentioned hereinabove has the effect of causing the selector 10c to operate in opposition to the selector 10. What happens is that when the pulley 2c transmits the starting torque to the shafts 1c and 1'c via the guide 24c, the pressing force of the pulley 3c, provided by the elastic element 14c, associated with its resistive torque, provided by the flexible link 5 fastened to the pulley 30 of the crankshaft V, has the effect of causing the selector assembly 10c and 15c to move to the extent of pressing the pulley 3c against the friction lining 15'c fastened to the flange 25c immobilized with respect to the shaft 1'c bis via the nut assembly 26c.

The pulley 3c is thus fastened to the shaft 1'c, and to the assembly of the automatic selector mounted on the shaft 1c of the accessory C. Ultimately, driving torque is transmitted from the shaft 1'c to the pulley 30 of the crankshaft V. The pulley 3c, of a diameter similar to that of the pulleys 2 and 3 of the automatic selected mounted on the shaft 1 of the alternator-starter A, rotates at a velocity ω3c=ω2c dependent on the ratio k: and which is therefore lower than ω1. This yields a torque C3c of magnitude:

$$C_{3c} = \frac{1}{k} \times C_{driving}$$

the driving torque in this mode being that of the alternator-starter ATD. In this case, the smaller k is, the larger the torque transmitted to the pulley 30 of the crankshaft V will be.

In this configuration, the rotational velocity of the accessory C is proportional to the ratio k and is therefore lower than the rotational velocity ω1 of the shaft of the alternator-starter ATD.

Alternator Mode

The combustion engine M has started, and it is transmitting driving torque to the transmission as a whole. The accessory C and the alternator-starter ATD are receivers because the direction of the torque is reversed.

In this instance, the automatic selectors on the shafts 1 and 1c of the alternator-starter ATD and of the accessory C (or continuations thereof) operate in the opposite way to the starting mode.

At the alternator-starter ATD (FIG. 19), the pulley 3, driven in rotation by the flexible link 5, exerts a pressing force on the selector assembly 10 and 15, which force is due to the elastic element 14 and associated with the resistive torque of the shaft 1 of the alternator-starter ATD on the helical connection 12 between the shaft 1' and the selector 10. This torque causes the selector 10 to move axially on the helical connection 12 in such a way as to press the pulley 3 against the friction lining 15'. The flange 25, fastened to the friction lining 15', is immobilized with respect to the shaft 1 by the nut assembly 26 and this makes it possible, using the selector assembly 10 and 15 to fasten the pulley 3 to the shaft 1' and transmit power from the pulley 30 of the crankshaft V to the shaft 1 of the alternator-starter ATD. Likewise, the pulley 2 fastened to the shaft 1' transmits power to the pulley 2c of the accessory C via the flexible link 4.

At the accessory C (FIG. 20), the pulley 3c, driven in rotation by the flexible link 5, exerts driving torque on the selector assembly 10c and 15c. At the same time, the shaft 1c exerts a resistive torque on the selector 10c, via the helical connection 12c with the shaft 1'c. This results in the axial displacement of the selector 10c on the helical connector 12c until such point as the pulley 3c is unfastened from the automatic assembly mounted on the shaft 1c of the accessory C. At this stage, the elastic element 14c makes it possible to ensure the continuity of axial displacement of the selector 10c to the point of maximum slippage of the pulley 3c on the friction lining 15c, fastened to the selector 10c, so as to limit the heating-up of contacting components.

In this case, the pulley 2c, fastened to the shaft 1'c, transmits power from the pulley 30 of the crankshaft V to the accessory C, via the flexible link 4 and the automatic selector assembly mounted on the shaft 1 of the alternator-starter ATD. It should be noted that the rotational velocity ω1c of the shaft 1c is proportional to the ratio k; it is therefore lower than the velocity ω1 of the alternator-starter ATD.

The invention claimed is:

1. A transmission system comprising:
    a first (4) and a second (5) flexible link, that couple a crankshaft of a combustion engine to a shaft (1) of an alternator-starter;
    a two-state coupling device, wherein a first state of the two-state coupling device corresponds to a phase for starting the engine, in which the shaft (1) of the alternator-starter (ATD) drives the crankshaft (V) of the engine (M) with a first transmission ratio, and a second state of the two-state coupling device corresponds to a phase in which the crankshaft (V) of the engine (M) drives the shaft (1) of the alternator-starter (ATD) with a second transmission ratio, and in that the first transmission ratio is higher than the second transmission ratio; and
    a first (2) and a second (3) pulley coaxial with said shaft (1) of the alternator-starter (ATD), wherein, when the two-state coupling device is in the first state, the first pulley (2) is coupled to the shaft (1) of the alternator-starter (ATD) to provide the first transmission ratio and, wherein, when the coupling device is in the second state, the second pulley (3) is coupled to the shaft (1) of the alternator-starter (ATD) to provide the second transmission ratio;

wherein the two-state coupling device is arranged between the first (2) and the second (3) pulleys and includes at least one coupling element (10) that moves longitudinally parallel to the axis of the shaft (1) of the alternator-starter (ATD) between two positions corresponding to the first and second coupling device states respectively, as a function of the relative rotation speed between one of said first (2) or second (3) pulleys and the shaft (1) of the alternator-starter (ATD); and wherein said longitudinally movable coupling element comprises a selector (10) having a helical connection (12) to the shaft (1) of the alternator-starter (ATD), having at least a lateral face (10', 10") bearing a power transmission element (15, 16), and facing a flank (2', 3') of one of the first (2) and second (3) pulleys, and a control element (11, 14, 18, 22, 22') able to move with respect to the selector (10) and generating a minimum torque that is required for the correct displacement of the selector (10) along the helical connection (12).

2. The system as claimed in claim 1, wherein the coupling device comprises a means placing the coupling device in its second state when the angular velocity ($\omega$1) of the shaft (1) drops below the angular velocity ($\omega$3) of the second pulley (3).

3. The system as claimed in claim 1, wherein the first pulley (2) has a diameter smaller than that of the second pulley (3).

4. The system as claimed in claim 1, wherein the first (4) and second (5) flexible links are mounted between, respectively, the first (2) and second (3) pulleys and the grooves of a pulley (30) fastened to the crankshaft (V) of the engine (M).

5. The system as claimed in claim 1, wherein the first flexible link (4) is mounted between the first pulley (2) and a first groove ($23_1$) of a double intermediate pulley (23) the second groove ($23_2$) of which receives the second flexible link (5) mounted between the second pulley (3) and a groove of a pulley (30) fastened to the crankshaft (V) of the engine (M).

6. The system as claimed in claim 5, wherein said first groove ($23_1$) has a diameter greater than that of said second groove ($23_2$).

7. The system as claimed in claim 5, wherein it comprises a tensioning element (7) arranged on a strand part of the second flexible link (5) between the intermediate pulley (23) and the second pulley (3).

8. The system as claimed in claim 5, wherein the coupling device comprises a first and a second power transmission device that can be disengaged and that are mounted to act in opposition, the first being mounted coaxially with the first pulley (2) and the second being mounted coaxially with the double intermediate pulley (23).

9. The system as claimed in claim 8, wherein said first and second disengagable transmission devices have helical connections operating in opposite directions in order to cause said first and second devices to operate in opposite directions.

10. The system as claimed in claim 8, wherein said first and second disengagable transmission devices comprise a free wheel.

11. The system as claimed in claim 1, wherein the selector (10) has a first lateral face (10') facing a flank (2') of the first pulley (2) and bearing a first power transmission element (15), and a second lateral face (10") bearing the control element (11), said control element (11) being able to move in translation parallel to the axis of said shaft (1) and having an end face facing towards a flank (3') of the second pulley (3) and bearing a second power transmission element (16) comprising a friction lining, and wherein the selector (10) bears at least one elastic return element (14), which exerts a pressing force on the control element (11) so that said friction lining (16) presses against said flank (3') of the second (3) pulley.

12. The system as claimed in claim 11, wherein the elastic return element (14) is a spring.

13. The system as claimed in claim 1, wherein the selector (10) has a first (10') and a second (10") lateral face facing a flank (2', 3') of the first (2) and second (3) pulleys respectively and which respectively bear power elements (15, 16), the control element (11) being able to move in longitudinal translation with respect to the selector (10) parallel to the axis of said shaft (1, 1'), the control element (11) having a lateral face (11') facing towards a flank (3') of the second pulley (3) and bearing a friction lining (18), and wherein the selector (10) bears an elastic return element (14), which exerts a pressing force on the control element (11) so that said friction lining (18) of the control element (11) presses against said flank (3') of the second pulley (3).

14. The system as claimed in claim 13, wherein the elastic return element (14) is a spring.

15. The system as claimed in claim 1, wherein the selector has a first (10') and a second (10") lateral face bearing a power transmission element (15, 16) and facing a flank (2', 3') of the first (2) and second (3) pulleys respectively, the control element (11) rotating as one with the selector (10) and for any longitudinal position of the selector, generating a torque which is dependent on the relative angular displacement between the selector (10) and at least one of the first (2) and second (3) pulleys.

16. The system as claimed in claim 15, wherein the control element (11) has an elastically deformable element (18) which, at longitudinal ends thereof, has deformable regions (19, 19') which are in contact with said flank (2') of the first pulley (2) and said flank (3') of the second pulley (3), respectively, at least when the selector (10) is in one longitudinal position.

17. The system as claimed in claim 15, wherein the control element (11) has, on at least one lateral face, a magnetic element (22, 22') facing a complementary magnetic element (20, 20') borne by said flank (2', 3') of one of the first (2) and second (3) pulleys.

18. The system as claimed in claim 15, wherein the selector (10) has, on two opposite lateral faces (10', 10"), a power transmission element (15, 16), one of them (15) facing a flank (2') of the first pulley (2), and the other (16) facing a flank (3') of the second pulley (3) and wherein the selector (10) has an annular magnetic element (22) arranged at a periphery and situated facing a complementary annular magnetic element (20) fastened to the second pulley (3).

19. The system as claimed in claim 15, wherein the selector (10) has a friction element (18), which is situated at a periphery and is in contact with an annular region (19''') of the second pulley (3).

20. The system as claimed in claim 19, wherein the friction element (18) is deformable.

21. The system as claimed in claim 1, wherein the selector (10) has a first (10') and a second (10") lateral face bearing a power transmission element (15, 16) and facing a flank (2', 3') of the first (2) and second (3) pulleys respectively, the control element (11) being able to move in translation with respect to the selector (10) and having, on at least one lateral face (11', 11"), a magnetic element (22', 22") facing a complementary magnetic element (20, 20') borne by a flank (2', 3') of one of the first (2) and second (3) pulleys.

22. The system as claimed in claim 1, wherein the helical connection (12) is one of a screw thread and a helical cam path.

23. The system as claimed in claim 1, wherein the power transmission element (15, 16) is one of a friction lining and a dog.

* * * * *